(12) United States Patent
Park et al.

(10) Patent No.: US 8,918,731 B2
(45) Date of Patent: Dec. 23, 2014

(54) CONTENT SEARCH METHOD AND DISPLAY DEVICE USING THE SAME

(75) Inventors: Jongsoon Park, Seoul (KR); John Manayil Roshy, Seoul (KR); Challagali Samavarthy, Seoul (KR); Junsoo Park, Seoul (KR); Sungjong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 13/397,099

(22) Filed: Feb. 15, 2012

(65) Prior Publication Data
US 2012/0209878 A1    Aug. 16, 2012

Related U.S. Application Data

(60) Provisional application No. 61/442,810, filed on Feb. 15, 2011.

(30) Foreign Application Priority Data

Jul. 5, 2011   (KR) .......................... 10-2011-0066551

(51) Int. Cl.
| | | |
|---|---|---|
| *G06F 3/00* | (2006.01) | |
| *G06F 17/30* | (2006.01) | |
| *H04N 21/482* | (2011.01) | |
| *G06F 3/0481* | (2013.01) | |
| *G06F 3/0488* | (2013.01) | |

(52) U.S. Cl.
CPC ...... *G06F 17/30967* (2013.01); *H04N 21/4828* (2013.01); *G06F 3/04817* (2013.01); *G06F 3/0488* (2013.01)
USPC ........................................................ 715/764

(58) Field of Classification Search
CPC ................... G06F 17/30023; G06F 17/30637; G06F 17/30964; G06F 17/30967; G06F 17/30991
USPC .................................................. 715/764–799
See application file for complete search history.

(56) References Cited

U.S. PATENT DOCUMENTS

| | | | | |
|---|---|---|---|---|
| 6,317,739 | B1 * | 11/2001 | Hirata et al. .......................... 1/1 |
| 6,968,511 | B1 * | 11/2005 | Robertson et al. ............ 715/835 |
| 7,272,601 | B1 | 9/2007 | Wang |
| 8,473,841 | B2 * | 6/2013 | Harris et al. ................... 715/235 |
| 2004/0244039 | A1 * | 12/2004 | Sugahara et al. ............... 725/52 |

(Continued)

FOREIGN PATENT DOCUMENTS

| | | |
|---|---|---|
| EP | 2 256 608 A2 | 12/2010 |
| KR | 10-2006-0082168 A | 7/2006 |
| KR | 10-2009-0084634 A | 8/2009 |
| KR | 10-2010-0109686 A | 10/2010 |

OTHER PUBLICATIONS

Korean Office Action dated Oct. 29, 2012 for Application No. 10-2011-0061963 with English Translation, 10 pages.

(Continued)

*Primary Examiner* — Tadeese Hailu
*Assistant Examiner* — Andrew Chung
(74) *Attorney, Agent, or Firm* — Fish & Richardson P.C.

(57) ABSTRACT

A content search method and a display device using the same are provided. The content search method displays a plurality of objects which includes a first object enabling input of search words, on a screen, and performs search with search words inputted to the first object, within a search range which is determined to correspond to a display location of the first object.

16 Claims, 9 Drawing Sheets

(56) References Cited

U.S. PATENT DOCUMENTS

| | | | |
|---|---|---|---|
| 2006/0190441 A1* | 8/2006 | Gross et al. | 707/3 |
| 2007/0028184 A1 | 2/2007 | Jang | |
| 2009/0132923 A1 | 5/2009 | Han et al. | |
| 2010/0037261 A1* | 2/2010 | Ohta et al. | 725/40 |
| 2010/0313143 A1 | 12/2010 | Jung et al. | |
| 2011/0059759 A1* | 3/2011 | Ban | 455/466 |
| 2011/0126252 A1* | 5/2011 | Roberts et al. | 725/114 |
| 2011/0202886 A1* | 8/2011 | Deolalikar et al. | 715/853 |
| 2012/0174011 A1* | 7/2012 | Cabrera-Cordon et al. | 715/769 |

OTHER PUBLICATIONS

European Search Report dated Jan. 29, 2014 for Application No. EP12000894, 5 pages.

\* cited by examiner (a)

(b)

(a)

(b)

(c)

(a)

(b)

(c)

(a)

(b)

(c)

CONTENT SEARCH METHOD AND DISPLAY DEVICE USING THE SAME

CROSS-REFERENCE TO RELATED APPLICATIONS

The present application claims priority under 35 U.S.C. 119 and 35 U.S.C. 365 to Korean Patent Application No. 10-2011-0066551 (filed on 5 Jul. 2011) and U.S. Provisional Patent Application No. 61/442,810 (filed on 15 Feb. 2011), which are hereby incorporated by reference in their entirety.

BACKGROUND

Among other things, a method for searching content in a display device according to search words inputted from a user will be described herein.

Recently, digital television (TV) services using a wired or wireless communication network are becoming more common. Digital TV services provide various services that cannot be provided by the existing analog broadcast service.

For example, as a type of digital TV service, an Internet Protocol Television (IPTV) service provides interactivity so as to enable a user to actively select the kind of program for viewing, a viewing time, etc. The IPTV service provides various additional services (e.g., Internet search, home shopping, online games, etc.) based on interactivity.

SUMMARY

Generally, various methods, systems, and apparatuses are described for searching content according to search words inputted from a user.

One innovative aspect of the subject matter described in this specification is embodied in methods that include the actions of: displaying, on a display surface of a display device, a plurality of graphical objects including a search object; determining an area of the displayed surface covered by the search object; based on the determined area covered by the search object, defining a search range for the search object; receiving, through interaction with the search object, one or more search terms; and performing a search within the determined search range based on the received one or more search terms.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, the method may further include: receiving a user input corresponding to a command to move the location at which the search object is displayed on the display surface of the display device; updating, based on the received user input, the location at which the search object is displayed on the display surface of the display device; determining, based on the updated location at which the search object is displayed on the display surface of the display device, a second area of the displayed surface covered by the search object; based on the determined second area covered by the search object, defining a second search range for the search object; receiving, through interaction with the search object, one or more additional search terms; and performing a search within the determined second search range based on the received one or more additional search terms.

Additionally or alternatively, defining a search range for the search object may include: determining that area covered by the search object overlaps with a second of the displayed plurality of graphical objects; accessing an attribute associated with the second object overlapped by the search object, the attribute associated with the second object being an attribute other than a location of the second object; and/or defining the search range for the search object based on the accessed attribute associated with the second object.

Additionally or alternatively, accessing an attribute associated with the second object overlapped by the search object may include accessing information that indicates that the second object represents a folder that contains one or more contents. Moreover, performing the search may include performing the search with regard to the one or more contents contained in the folder based on the received one or more search terms.

Additionally or alternatively, the method may include identifying, based on the performed search, one or more contents contained in the folder that correspond to the received one or more search terms; and displaying the identified one or more contents in a manner that differentiates the identified one or more contents from the other contents contained in the folder.

Additionally or alternatively, accessing an attribute associated with the second object overlapped by the search object may include accessing information that indicates that the second object represents an application that enables the search of content. Moreover, performing the search may include performing the search with regard to the content for which the application enables search based on the received one or more search terms.

Additionally or alternatively, performing the search with regard to the content for which the application enables search based on the received one or more search terms may include performing the search utilizing the application representing the second object.

Additionally or alternatively, defining the search range for the search object may include: determining whether the area of the display surface of the display device covered by the search object overlaps other displayed graphical objects, and, if determining that the area of the display surface of the display device covered by the search object overlaps no other displayed graphical objects, defining the search range to include all contents stored within a storage device of the display device. Moreover, performing the search may include performing the search with regard to all contents stored within the storage device of the display device based on the received one or more search terms.

Additionally or alternatively, the method may include: receiving a user input corresponding to a command to select the search object and move the location at which the search object is displayed on the display surface of the display device in a closed curve that encompasses at least one other of the plurality of displayed graphical objects; accessing an attribute associated with the at least one other displayed graphical object encompassed within the closed curve, the attribute associated with the at least one other displayed graphical object being an attribute other than a location of the at least one other displayed graphical object; and defining the search range for the search object based on the accessed attribute associated with the at least one other displayed graphical object.

Additionally or alternatively, accessing the attribute associated with the at least one other displayed graphical object encompassed within the closed curve may include accessing a first attribute associated with a first object encompassed within the closed curve and accessing a second attribute associated with a second object encompassed within the closed curve, the first attribute and the second attribute being different in type. Also, determining the search range for the search object may include determining the search range for the search object based on both of the first attribute and the second attribute.

Another innovative aspect of the subject matter described in this specification is embodied in a display device that includes: a display unit configured to display, on a display surface of the display device, a plurality of graphical objects including a search object; a user interface configured to receive a user input corresponding to a command to move the location at which the search object is displayed on the display surface of the display device; and a control unit. The control unit may be configured to perform one or more of the operations of: determine an area of the displayed surface covered by the search object; based on the determined area covered by the search object, defining a search range for the search object; receiving, through interaction with the search object, one or more search terms; and performing a search within the determined search range based on the received one or more search terms.

This and other embodiments may each optionally include one or more of the following features. For instance, the search range may be determined by an attribute of a second object which overlaps with the first object in display location. Also, the control unit may perform search in a folder corresponding to the second object when the second object is a folder comprising one or more contents.

Additionally or alternatively, the control unit may perform search with an application corresponding to the second object when the second object is an application enabling content search. The control unit may also perform search with a search application corresponding to the second object, on Internet. The control unit may also perform search for all contents stored in the display device when there is no object which overlaps with the first object in display location.

Additionally or alternatively, the search range may be determined by an attribute of at least one object placed inside a closed curve which is formed by movement of the first object. Two or more objects may be placed inside the closed curve have different attributes.

The details of one or more implementations are set forth in the accompanying drawings and the description below. Other features will be apparent from the description and drawings, and from the claims.

DETAILED DESCRIPTION

Figure 1:
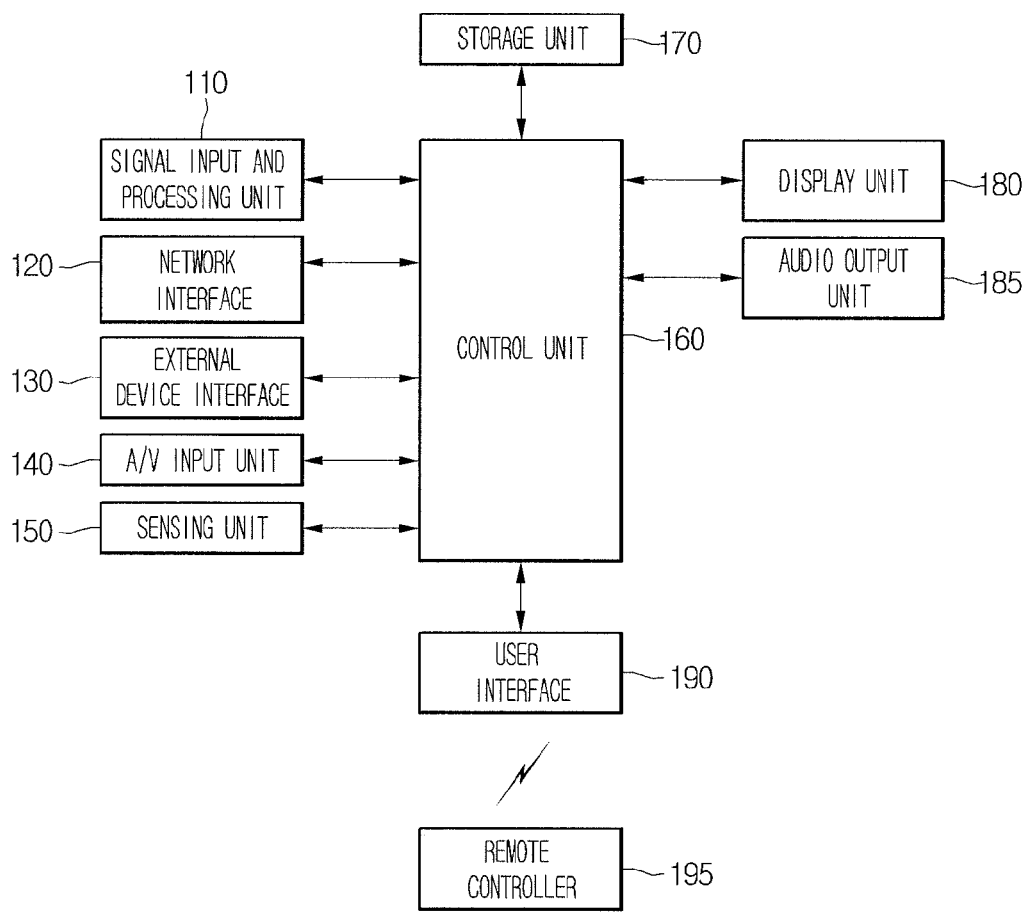
FIG. 1 is a block diagram illustrating a configuration of a display device.

FIG. 1 is a block diagram illustrating a configuration of a display device.

Referring to FIG. 1, a display device 100 may include a signal input and processing unit 110, a network interface 120, an external device interface 130, an A/V input unit 140, a sensing unit 150, a control unit 160, a storage unit 170, a display unit 180, an audio output unit 185, and a user interface 190.

The display device 100 may be an image display device such as a television (TV), a monitor, a notebook computer, or a tablet Personal Computer (PC) that may be connected to a mobile terminal over a wireless network.

For example, the display device 100 may be a network TV, an Internet Protocol TV (IPTV), a Hybrid Broadcast Broadband TV (HBBTV), or a smart TV that may perform various user-friendly functions as various applications are freely added or deleted to/from a general Operating System (OS) Kernel.

For example, the display device 100 may be one of various devices that output images and sounds, such as a portable phone, a smart phone, a tablet PC, a digital broadcasting terminal, a Personal Digital Assistant (PDA), a Portable Multimedia Player (PMP), an Internet phone such as SoIP, a navigation device, or an MP3 player.

The display device 100 may be connected to and external device to transmit/receive data in one of various wireless communication schemes such as Wireless LAN (WiFi), WiFi direct, WiFi display, Blutooth, ZigBee, binary Code Division Multiple Access (CDMA), Wireless broadband (Wibro), World Interoperability for Microwave Access (Wimax), High Speed Downlink Packet Access (HSDPA), Universal Plug and Play (UPnP)/Digital Living Network Alliance (DLBNA), Ultra wide band (UWB)/wireless Universal Serial Bus (USB).

In some implementations, the display device 100 may transmit/receive content to/from an external device in one of the above-described wireless communication schemes, and search contents stored in the display device 100 or the external device that is connected to a content server over the Internet, according to search words inputted by a user.

The content may be real-time broadcast, a movie, music, a photograph, a document file, Content On Demand (COD), a game, news, video call, an application, or the like.

Referring again to FIG. 1, the signal input and processing unit 110 receives and processes a signal from the outside. For example, the signal input and processing unit 110 may select a Radio Frequency (RF) broadcast signal, corresponding to a channel selected by the user or all pre-stored channels, from among a plurality of RF broadcast signals received through an antenna to receive the selected RF broadcast channel.

The network interface 120 may provide an interface for connecting the display device 100 to a wired/wireless network, and transmit/receive data to/from an external device in various wireless communication schemes that have been described above with reference to FIG. 1.

For example, the network interface 120 may establish a wireless network connection with the mobile terminal according to a communication standard such as WiFi or Bluetooth, and transmit/receive content data and information for data communication to/from the mobile terminal over the connected network.

Moreover, the network interface 120 may include an Ethernet terminal for accessing the Internet, and access a webpage through the Ethernet terminal to receive content, provided from a specific content provider or a network provider, such as a movie, an advertisement, a game, VOD, a broadcast signal, or the like.

The external device interface 130 may connect an external device and the display unit 180, for example, access an external device such as a Digital Versatile Disk (DVD), Blu-ray, a game machine, a camera, a camcorder, or a computer (for example, a notebook computer) in a wireless way or a wired way.

In order for the display unit 180 to receive a video signal and an audio signal from an external device, the A/V input unit 140 may include a Composite Video Banking Sync (CVBS) terminal, a component terminal, an S-video terminal (analog), a Digital Visual Interface (DVI) terminal, a High Definition Multimedia Interface (HDMI) terminal, RGB terminals, and a D-SUB terminal.

The A/V input unit 140 may include a camera or a microphone and acquire data corresponding to an image or voice of a user. The acquired data may be delivered to the control unit 160.

The sensing unit 150 may include various sensors such as a touch sensor, a magnetometer, an accelerometer, a proximity sensor, a gyroscope sensor, an ambient light sensor, a colorimeter, and a tag, for sensing the current state of the display device 100.

The control unit 160 controls an overall operation of the display device 100. The control unit 160 may demultiplex a data stream that is inputted through the signal input and processing unit 110, the network interface 120, or the external device interface 130, and process the demultiplexed signals, thereby generating and outputting a signal for output of video or audio.

The storage unit 170 may store a program for the signal processing and control of the control unit 160, and store the signal-processed video, audio, or data signal.

Moreover, the storage unit 170 may temporarily store a video, audio, or data signal that is inputted from the external device interface 130 or the network interface 120, or store information regarding a predetermined broadcast channel with a channel storage function.

The storage unit 170 may store an application or an application list that is inputted from the external device interface 130 or the network interface 120.

The storage unit 170, for example, may include at least one storage medium of a flash memory, a hard disk, a micro MultiMediaCard (MMC) type of memory, a card type of memory (for example, an SD or XD memory, etc.), a Random Access Memory (RAM), and a Read Only Memory (ROM, for example, Electrically Erasable and Programmable Read Only Memory (EEPROM), etc.).

The display device 100 may provide content data (for example, a moving image file, a still image file, a music file, a document file, an application file, or the like) stored in the storage unit 170 to a user by displaying the content data.

The user interface 190 delivers a signal inputted by the user to the control unit 160, or delivers a signal, inputted from the control unit 160, to the user.

For example, the user interface 190 may receive a control signal or a user input signal such as power-on/off, selection of a channel, or setting of a screen from a remote controller 195 in one of various communication schemes such as Bluetooth, Radio Frequency Identification (RFID), Infrared Data Association (IrDA), Ultra Wideband (UWB), Zigbee, and Digital Living Network Alliance (DLNA) and process the received signal. Alternatively, the user interface 190 may process the control signal from the control unit 160 in order for the control signal to be transmitted to the remote controller 195.

The control unit 160 may control the display unit 180 so as to display an image. For example, the control unit 160 may perform control such that the display unit 180 displays a broadcast image inputted through the signal input and processing unit 110, an external input image inputted through the external device interface 130, an image inputted through the network interface 120, or an image stored in the storage unit 170. An image displayed by the display unit 180 may be a still image or a moving image, and be a Two-Dimensional (2D) image or a Three-Dimensional (3D) image.

The display unit 180 may include a screen portion positioned such that it is exposed to the a surface of the display device 100 for displaying an image.

The display unit 180 converts an image signal, a data signal, and an On Screen Display (OSD) signal that have been processed by the control unit 160 into RGB signals to generate a driving signal. Alternatively, the display unit 180 converts an image signal and a data signal, which are received through the external device interface 130, into RGB signals to generate a driving signal.

The display unit 180 may display an image utilizing one of various display types, such as Plasma Display Panel (PDP), Liquid Crystal Display (LCD), Organic Light Emitting Diode (OLED), flexible display, and 3D display. The display unit 180 may be configured with a touch screen and used as an input device as well as an output device.

The audio output unit 185 receives a signal (for example, a stereo signal, a 3.1 channel signal or a 5.1 channel signal) audio-processed by the control unit 160 to output audio.

The configuration of the display device according to one implementation has been described above with reference to FIG. 1, but the present invention is not limited thereto. As another example, the elements of FIG. 1 may be partially integrated or omitted, or other elements may be added, according to the main function or specification of a display device.

In some implementations, the display device 100, having the above-described configuration of FIG. 1, may display a plurality of objects, including a first object enabling the input of search words, on a screen and perform search using the search words inputted to the first object, in a search range that has been determined so as to be in correspondence with a display location of the first object.

For example, the display unit 180 of the display device 100 may display a plurality of objects for performing various functions. At least one of the displayed objects may be a search window type of search object enabling a user to input search words.

Moreover, a location where the search object is displayed may be capable of being moved to any arbitrary location of a screen of the display device 100 and a search range may be limited to correspond to a location where the search object is displayed.

That is, the user may move the search object to overlap with a region where a specific object is displayed and thereafter input desired search words to the search object to search the specific object. The control unit 160 of the display device 100 may determine the search range according to an attribute of the specific object that overlaps with the display location of the search object.

Hereinafter, various implementations of a content search method will be described in more detail with reference to FIGS. 2 to 10.

Figure 2:
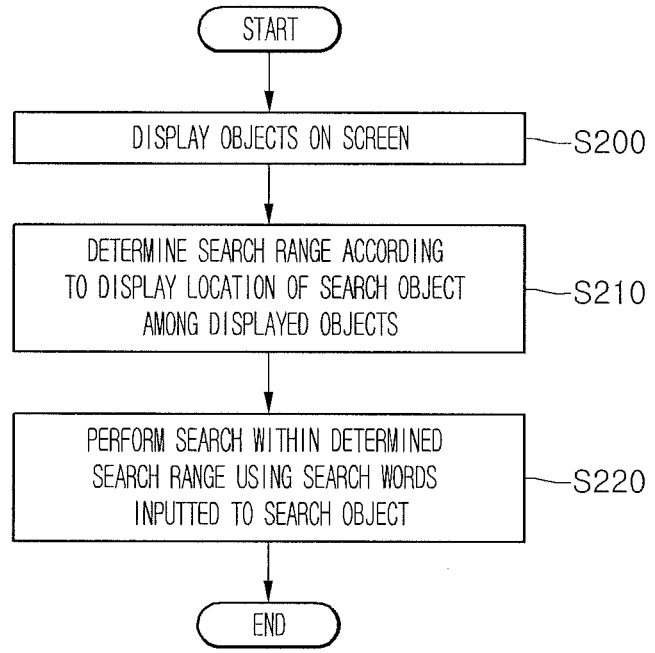
FIG. 2 is a flowchart illustrating a content search method.

FIG. 2 is a flowchart illustrating a content search method. The content search method illustrated in FIG. 2 will be described below with reference the block diagram of FIG. 1 that illustrates an example of a configuration of the display device. However, the content search method illustrated in FIG. 2 can be performed with regard to various other display device configurations.

Referring to FIG. 2, the display unit 180 of the display device 100 displays a plurality of objects on a screen thereof in operation 5200.

For example, each of the objects is a Graphical User Interface (GUI) element for displaying a specific function on the screen, and may be freely placed on the screen according to a user input.

Figure 3:
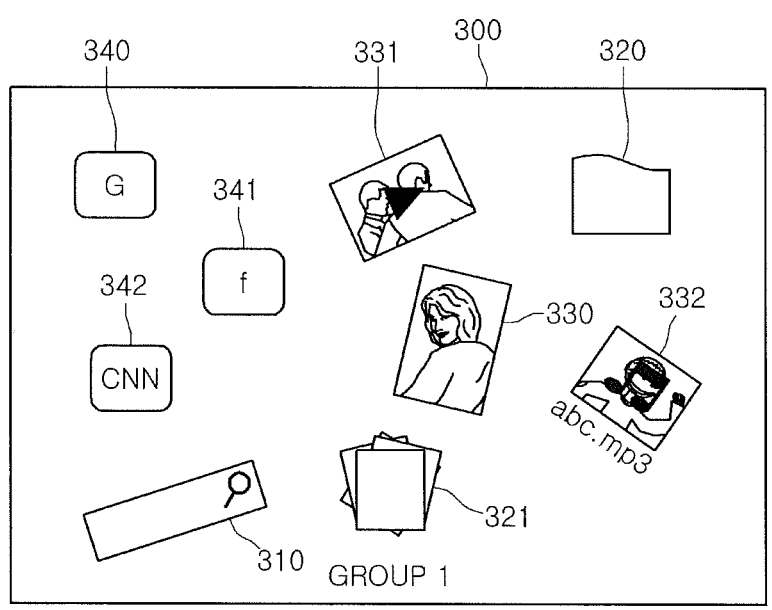
FIG. 3 is a view illustrating a screen configuration of a display device.

Referring to FIG. 3, a plurality of objects 320, 321, 330 to 332, and 340 to 342, which respectively represent specific content (or a file), a content group (or a file group), a folder, an application, etc. These objects may be displayed together with a search widget 310, which represents a search object.

Each of the objects may be displayed on a screen 300 as an identifiable icon type of image such as a thumbnail image indicating pertinent function or content.

For example, the user may select the search widget 310 (by, for example, touching a location on the screen of the display device at which the search widget 310 is displayed) and then input search words to search desired content. Additionally, the user may move a display location of the search widget 310 to an arbitrary location of the screen 300.

More specifically, when the display unit 180 is configured with a touch screen and functions as a user input means, the user may select the search widget 310, drag and move the search widget 310 in a desired direction, and then drop the search widget 310 to a desired location, with a tool such as a finger.

Alternatively, the user may move a display location of the search widget 310 with a key button included in the remote controller 195, or move the display location of the search widget 310 with a motion recognizing function of the remote controller 195.

Moreover, the folder object 320 may include a plurality of contents such as photographs, moving images, and music. The user may select the folder object 320 to check a plurality of contents included in a corresponding folder or files respectively corresponding to the contents, and then select and display desired content.

In some implementations, the folder object 320 may represent a virtual container of files, applications, objects, and/or other folders and may be stored in the storage unit of the display device or in a different storage unit. In other implementations, the folder object 320 may represent a directory within a file system stored in the storage unit of the display device. However, the folder object 320 is not limited to these implementations and may represent any computer file construct designed to contain, list, catalog, or otherwise relate one or more files, applications, objects, and/or other folders.

The above-described contents may be grouped into a group object 321 and displayed on the screen 300 together with a group name (e.g., group 1). When the user selects the group object 321, a plurality of thumbnail images corresponding to contents included in a corresponding group may be spread and displayed on the screen 300.

Contents stored in the display device 100 (e.g., thumbnail image types of content objects 330 to 332 that respectively correspond to a photograph, a moving image, and music) may be displayed on the screen 300 of the display device 100.

Moreover, the application objects 340 to 342 that respectively indicate various applications (e.g., search, messenger, news, mail, Social Network Service (SNS), etc.) may be displayed on the screen 300.

For example, the search application object 340 may provide a search function for contents provided over the Internet, and the SNS application object 341 may provide SNS service that enables the forming of an online relationship with anon-specific user. Also, the news application object 342 may provide news content obtained from a corresponding news medium.

The control unit 160 of the display device 100 determines a search range according to a display location of a search object among the displayed objects in operation 5210, and performs search within the determined search range by using search words inputted to the search object in operation 5220.

For example, the control unit 160 may determine the search range according to an attribute of an object that overlaps the location at which a search object is displayed.

That is, the user may move a display location of the search object in order to partially overlap with another object displayed on the screen. Thereafter, the user may input search words by using the search object, in which case one or more attributes of the other overlapped object (e.g., contents included in a corresponding object, a function performed by the corresponding object, or the like) may be utilized in limiting a content search based on the input search words.

Figure 4:
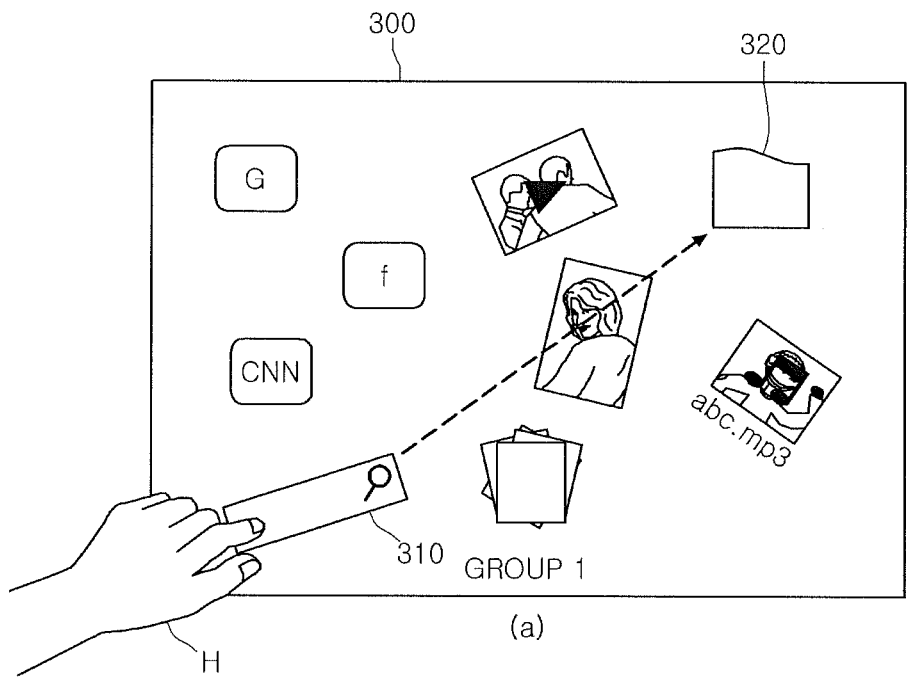
FIG. 4 is a view illustrating a method for moving a display location of a search object based on a user input.
Figure 4:
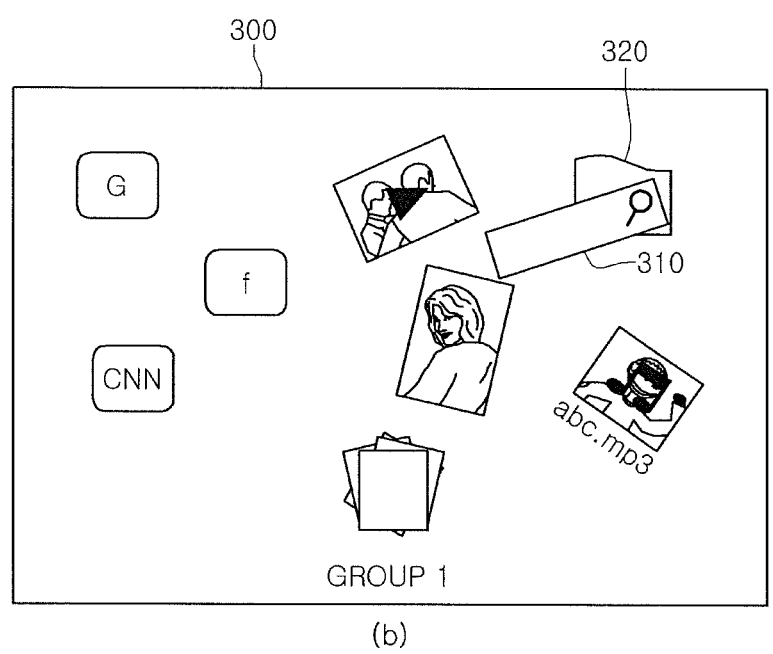

Referring to FIG. 4, when a user moves the search widget 310 displayed on a screen 300 and places the search widget 310 so as to overlap with a folder object 320 including one or more contents (or files), a search may be performed in a folder corresponding to the folder object 320.

For example, as illustrated in a portion (a) of FIG. 4, the user, with a finger H, may select the search widget 310 displayed on the screen 300 that is configured as a touch screen, drag the search widget 310 in a direction toward the folder object 320, and drop the search widget 310 at a region displaying the folder object 320.

In this case, the control unit 160 may search at least one content, which corresponds to search words inputted by the user, among a plurality of contents included in a folder corresponding to the folder object 320 by using the search widget 310.

In searching content according to the input search words, the control unit 160 may use various search mechanisms that have been known to those skilled in the art, and thus its detailed description is not provided.

Figure 5:
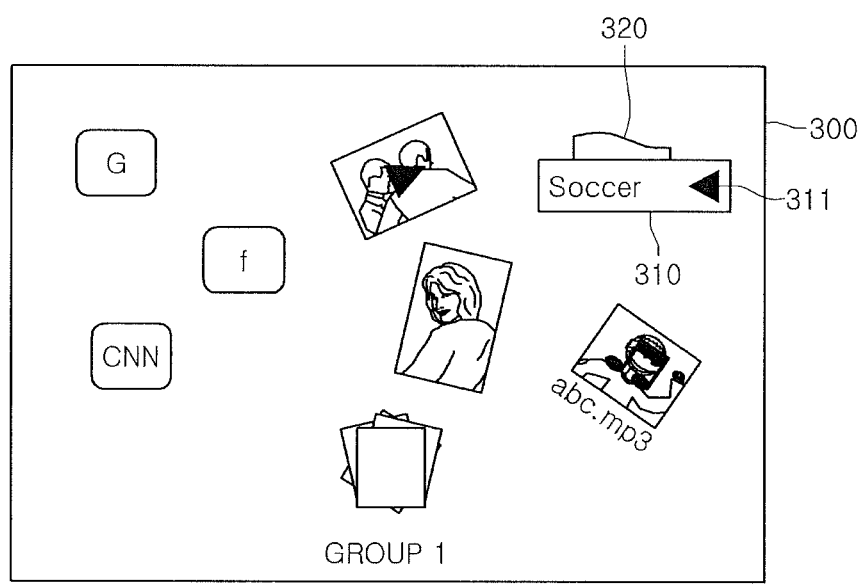
FIG. 5 is a view illustrating a method for determining a search range so as to correspond to a display location of a search object.

Referring to FIG. 5, the search widget 310 may be moved and disposed, based on a user input, in a region overlapping with the folder object 320 Thereafter, the user may select the search widget 310 by touching the inside of the search widget 310 to change to a mode enabling the input of search words.

That is, when the user touches the inside of the search widget 310, a search window of the search widget 310 enabling the input of search words may be enlarged and displayed, and the user may input desired search words (e.g., "soccer") with a plurality of character/number input keys that are included in the user interface 190 or the remote controller 195 or displayed the screen 300.

The search widget 310 may include a delete button 311 that enables all or a portion of pre-input search words to be deleted.

As illustrated in FIG. 5, when the user moves a display location of the search widget 310 so as to overlap with the folder object 320 and then inputs search words "soccer" with the search widget 310, content corresponding to the input search word "soccer" may be used to search in a folder corresponding to the folder object 320.

In FIG. 5, the searched result based on the search words inputted by the user may be limited to contents that are included in a folder corresponding to the folder object 320, and therefore, the user may designate a folder, in which content search is required, through a simple motion.

The above-described folder object 310 may be implemented as a group object that groups and displays a plurality of contents.

Figure 6:
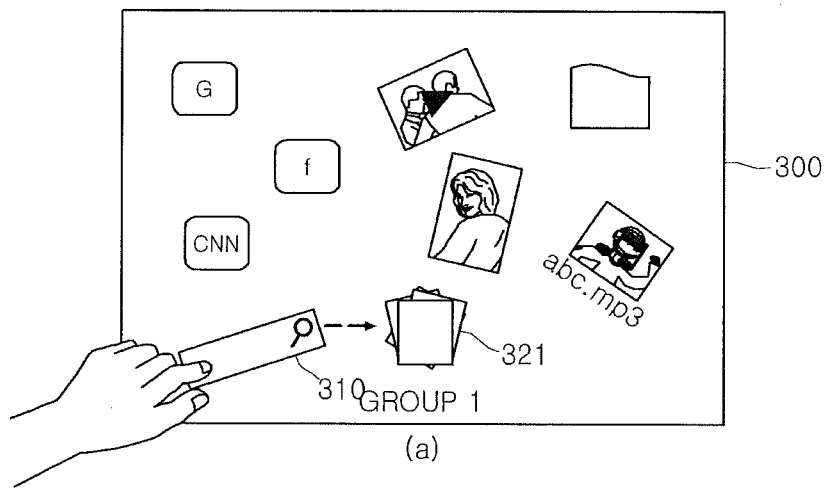
FIG. 6 is a view illustrating a first method for performing search when a display location of a search object overlaps with a group object.
Figure 6:
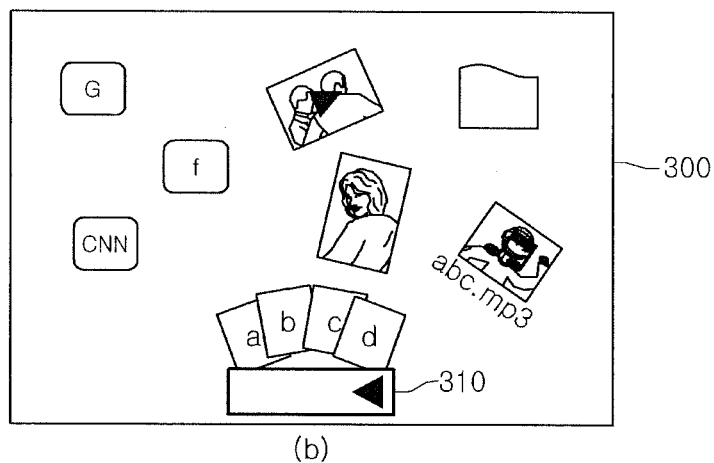
Figure 6:
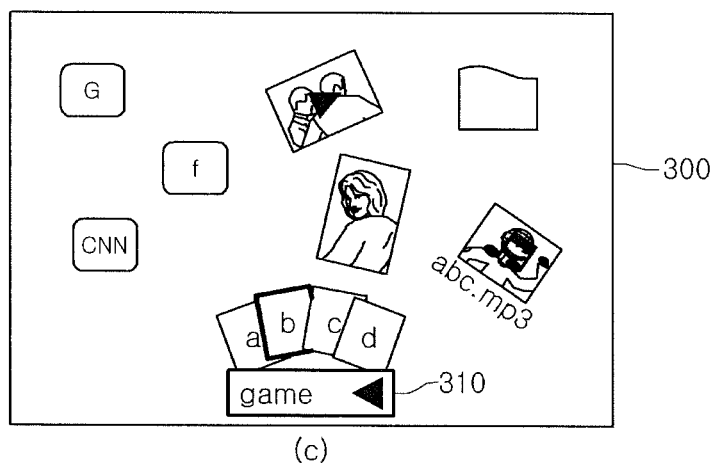

Referring to FIG. 6, when a user moves the search widget 310 displayed on a screen 300 and places the search widget 310 so as to overlap with a group object 320 including two or more contents (or files), a search may be performed in a content group corresponding to the group object 320.

For example, as illustrated in a portion (a) of FIG. 6, when the user selects the search widget 310 displayed on the screen 300 and drags the search widget 310 in a direction displaying the group object 321, the search widget 310 may be placed and displayed in a location where a group name of a group object 321 "group 1" was displayed.

When the search widget 310 moves to a location where the group name of the group object 321 "group 1" was displayed, as illustrated in a portion (b) of FIG. 6, the search widget 310 may be enlarged and displayed so as to enable the input of search words. Simultaneously, information regarding contents included in the group 1 corresponding to the group object 321 may be spread and displayed on the screen 300.

For example, a plurality of thumbnail images respectively corresponding to the contents included in the group 1 may be spread in a card-type manner, thereby enabling the user to perceive summary information regarding contents within a search range.

Subsequently, as illustrated in a portion (c) of FIG. 6, when the user inputs search words "game" to the search widget 310, content (e.g., "content b") corresponding to the input search words "game" among the contents included in the group 1 may be identified based on the search.

Moreover, content corresponding to the input search words among a plurality of contents included in the above-described folder or group may be displayed on the screen 300 in order to be differentiated from other contents.

Referring to the portion (c) of FIG. 6, among contents a, b, c, and d included in the group 1, a thumbnail image of the content b corresponding to the search words "game" that have been inputted with the search widget 310 may be highlighted and displayed so as to be differentiated from thumbnail images of other contents, and thus, the user can check in real time the searched result based on the input search words, in a corresponding folder or group.

Moreover, the user may select and display one or more contents, searched according to search words that have been inputted with the search widget 310, among a plurality of contents included in a specific folder or group or configure the selected contents as a separate object.

Figure 7:
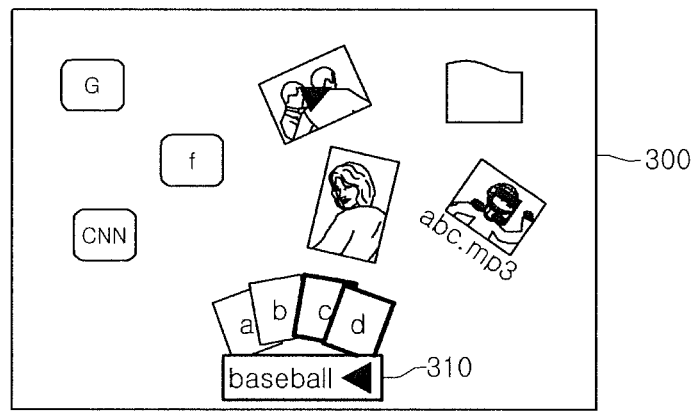
FIG. 7 is a view illustrating a second method for performing search when a display location of a search object overlaps with a group object.
Figure 7:
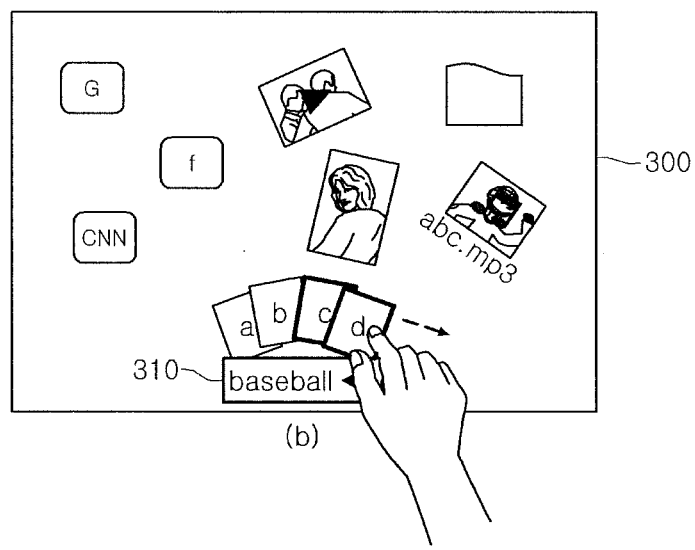
Figure 7:
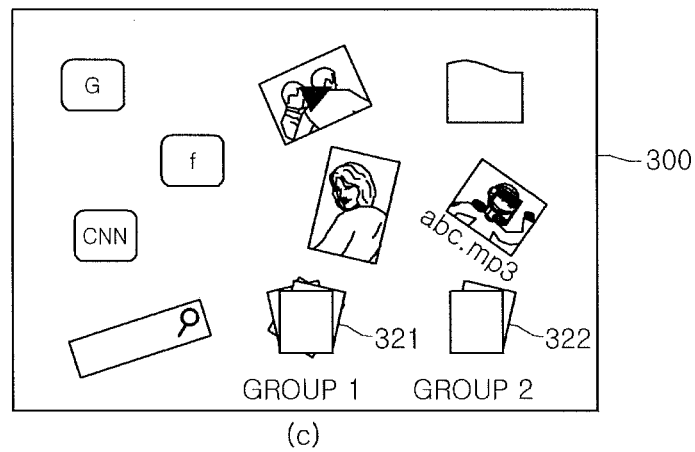

Referring to FIG. 7, the user may select the contents c and d, corresponding to search word "baseball" that has been inputted with the search widget 310, from among the contents a, b, c, and d included in the group 1 to move the selected contents c and d out of group 1, and thus generate a separate group 2 including the contents c and d. In this case, a group object 322 corresponding to the generated group 2 may be displayed on a screen 300.

In some implementations, when the search widget 310 is moved and placed to overlap with an application object enabling content search according to a user input, search may be performed with an application corresponding to the overlapped application object.

Figure 8:
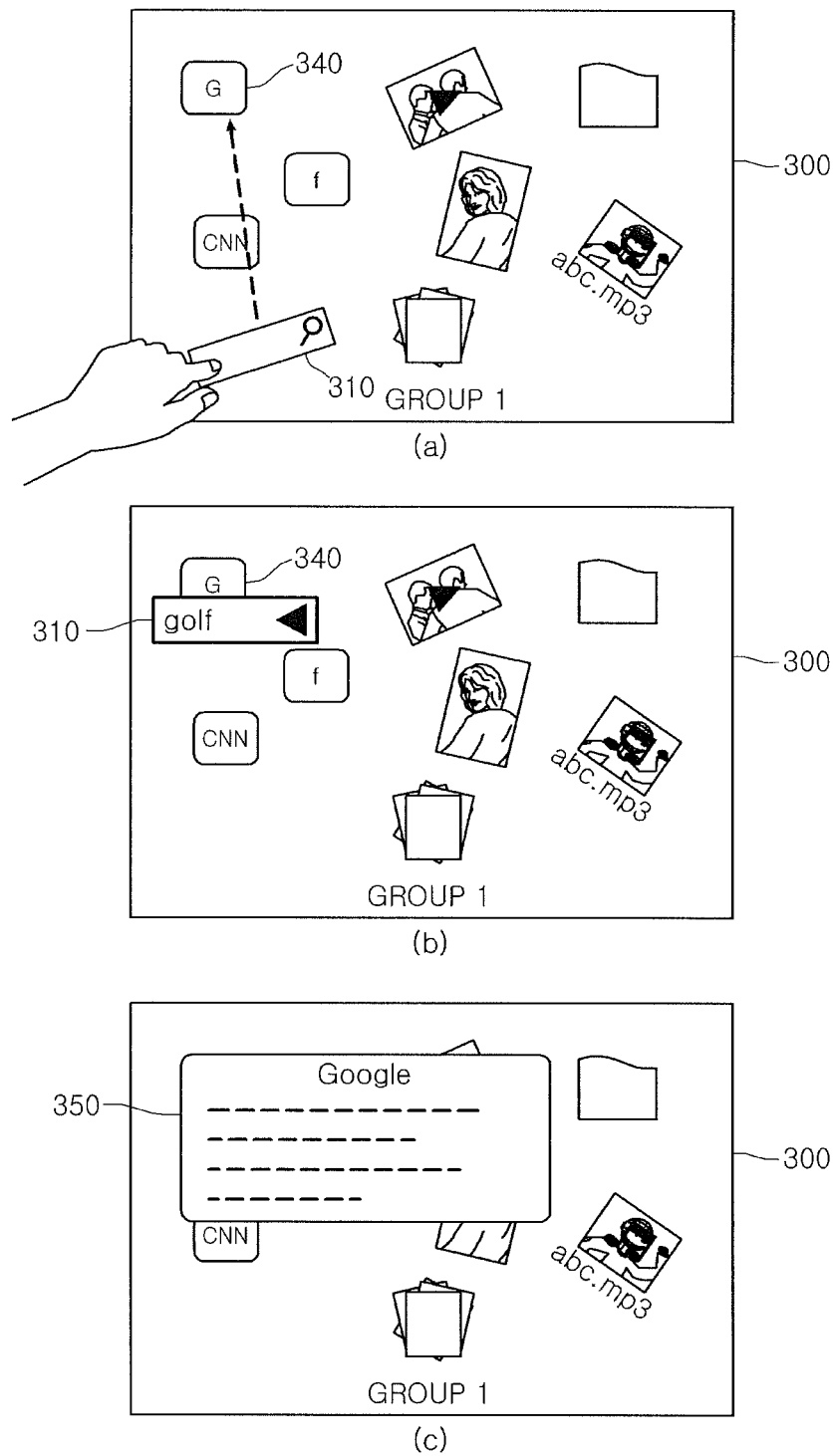
FIG. 8 is a view illustrating a method for performing search when a display location of a search object overlaps with an application object.

Referring to FIG. 8, when the user moves the search widget 310 displayed on a screen 300 and places the search widget 310 so as to overlap with a search application object 340 enabling Internet search, the Internet may be searched with the search application corresponding to the search application object 340.

For example, as illustrated in portion (a) and portion (b) of FIG. 8, when the user moves the search widget 310 displayed on the screen 300 and places the search widget 310 so as to overlap with a region displaying the search application object 340, the search widget 310 may be enlarged and displayed so as to enable the input of search words.

When the user inputs the search word "golf" into the search widget 310, content corresponding to the input search word "golf" may be searched on the Internet by using a search application corresponding to the search application object 340 (e.g., an application that searches the Internet with the search engine of Google®). Also, the contents that are searched with the search application object 340 may be, for example, various kinds of contents such as webpages, photographs, moving images, and music.

Referring to a portion (c) of FIG. 8, the searched result using the search application may be provided to the user by a search result display window 350 displayed on a screen 300.

When a display location of the search widget 310 overlaps with an SNS application object 341, a content search based on the input search words may be performed with regard to an SNS server corresponding to the SNS application object 341.

Moreover, when the display location of the search widget 310 overlaps with a news application object 342, a content search based on the input search words may be performed with regard to a news content providing server corresponding to the news application object 342.

In some implementations, when the search widget 310 is placed in a region that does not overlap with another object on the screen 300, search may be performed with regard to the display device 100.

Figure 9:
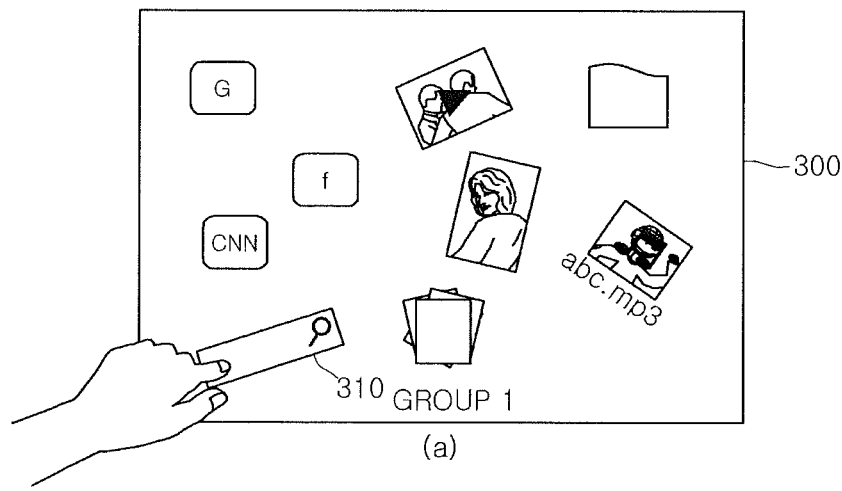
FIG. 9 is a view illustrating a method for performing search when a search object is placed on wallpaper.
Figure 9:
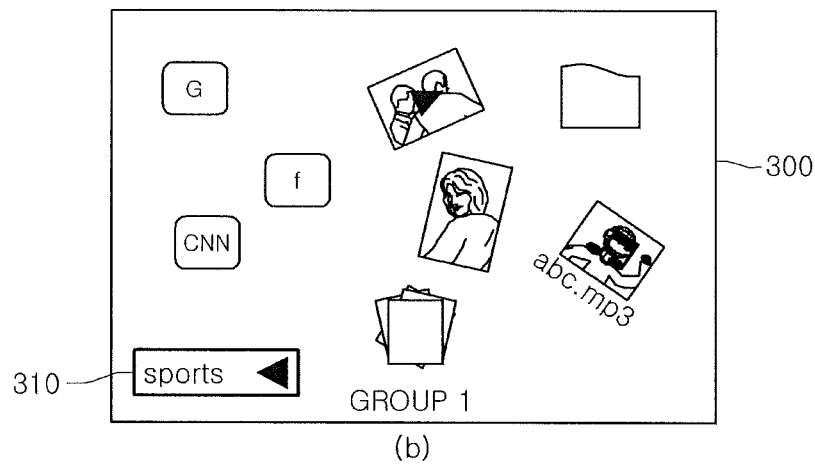
Figure 9:
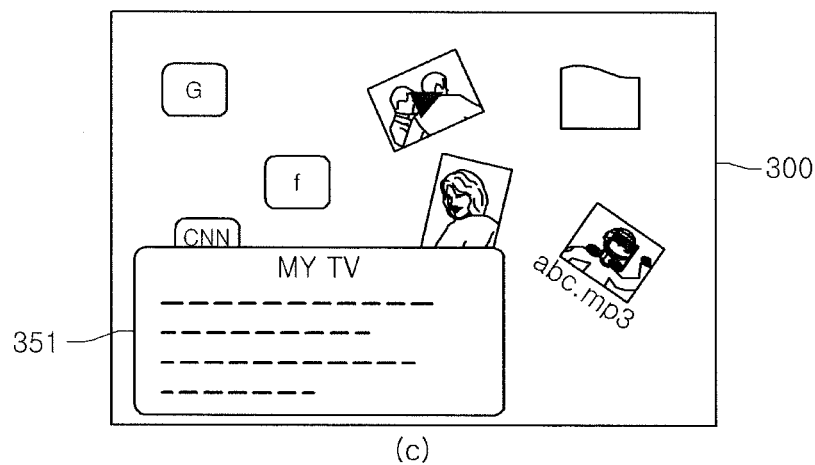

Referring to FIG. 9, when the user moves the search widget 310 displayed on a screen 300 to place the search widget 310 in a wallpaper region where no other object is displayed and then inputs search words, content corresponding to the input search words among all contents stored in the display device 100 may be searched.

For example, as illustrated in a portion (a) and portion (b) of FIG. 9, when the user places the search widget 310 at a location corresponding to a wallpaper of the display device and then touches the inside of the search widget 310, the search widget 310 may be enlarged and displayed so as to enable the input of search words.

When the user inputs the search word "sports" to the search widget 310, content corresponding to the input search word "sports" among all contents that are included in the display device 100 or stored in a storage medium connected to the outside may be identified as a result of the search.

Figure 10:
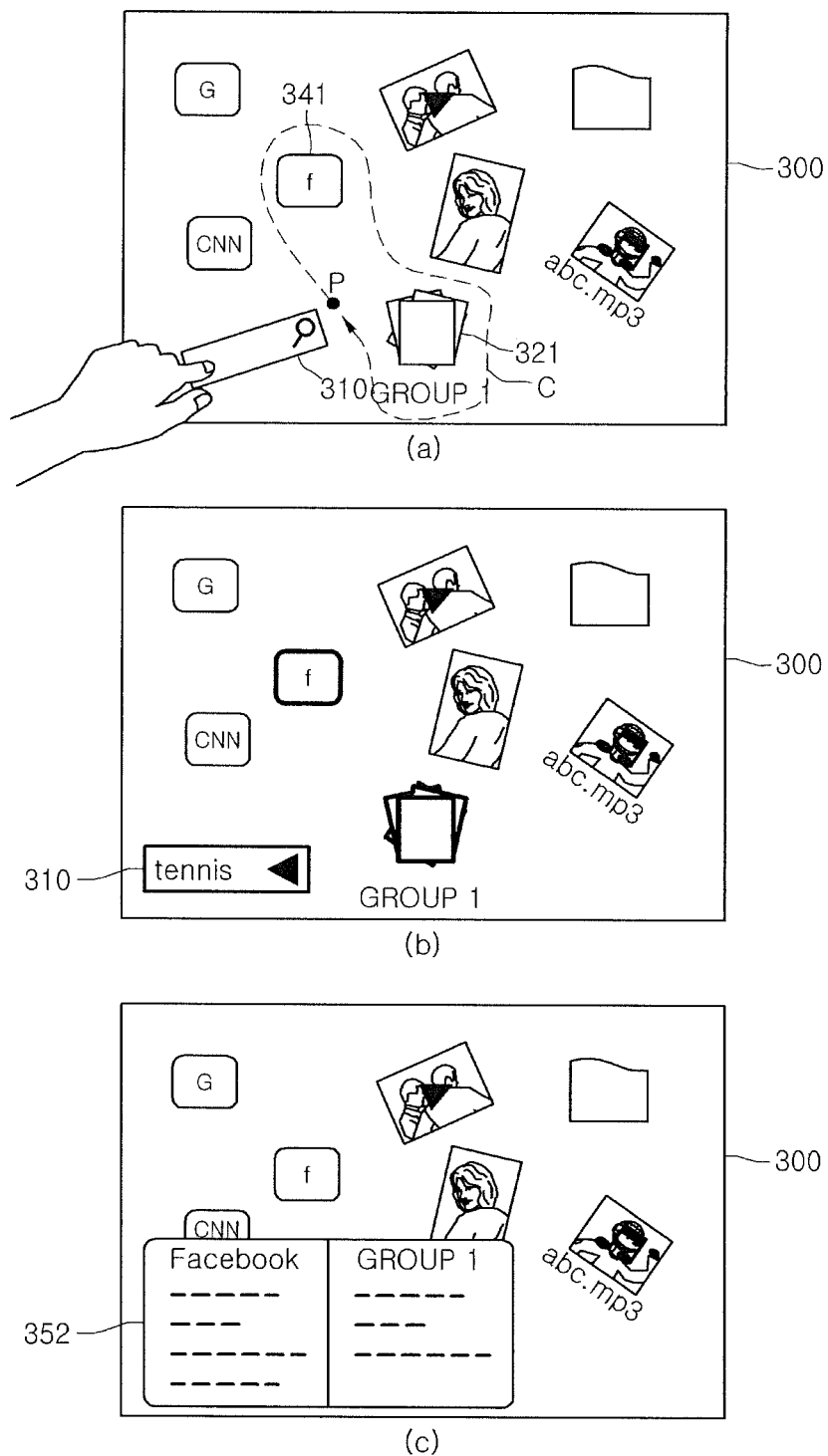
FIG. 10 is a view illustrating a method for designating a search range forming a closed curve by the movement of a search object.

Referring to a portion (c) of FIG. 10, the searched result in the display device 100 may be provided to the user by the search result display window 351 displayed on a screen 300.

Moreover, the above-described search range may be determined by an attribute of at least one object placed inside a closed curve that is formed by the movement of the search object.

Referring to FIG. 10, a user may form a closed curve C by selecting and dragging the search widget 310 such that at least one of a plurality of objects displayed on a screen 300 is placed inside the closed curve C, in which case the search range may be determined by an attribute of at least one object placed inside the closed curve C.

For example, as illustrated in a portion (a) and portion (b) of FIG. 10, the user may select the search widget 310 and then draw a closed curve C beginning from a start point P such that an SNS application object 341 and an object 321 "group 1" are placed inside the closed curve C. Therefore, the SNS application object 341 and object 321 "group 1" inside the closed curve C may be designated as a search range.

In this case, the SNS application object 341 and object 321 "group 1" designated as the search range may be highlighted and displayed on a screen 300 in order to be differentiated from other objects.

Subsequently, when the user inputs the search word "tennis" to the search widget 310, an SNS server corresponding to the SNS application object 341 and content corresponding to the input search word "tennis" among contents included in the group 1 may be searched.

Referring to a portion (c) of FIG. 10, the searched result using the SNS application object 341 and object 321 "group 1" may be provided to the user by a search result display window 352 displayed on a screen 300.

The content search methods described herein may be manufactured as programs executable in computers and be stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can be distributed over network coupled computer systems so that the computer readable code is stored and executed in a distributed fashion. Also, functional programs, codes, and code segments for implementing the methods and processes described herein can be easily construed by programmers skilled in the art.

In searching content with the display device, the content search method determines a search range so as to be in correspondence with a display location of a movable search object according to a user input, and thus enables a user to easily search various contents that are stored in the display device or provided from the outside.

Although various implementations have been described, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of searching content according to search words inputted from a user, in a display device, the method comprising:
displaying, on a display surface of a display device, a plurality of graphical objects including a first object corresponding to a search object, wherein the plurality of graphical objects other than the search object are associated with a plurality of attributes for search, and one attribute is different from another attribute;
determining which object is overlapped with the search object by an area of the displayed surface covered by the search object among the plurality of graphical objects;
accessing an attribute associated with the overlapped object;
defining a search range for the search object based on the accessed attribute associated with the overlapped object;
receiving, through interaction with the search object, one or more search terms; and
performing a search within the determined search range based on the received one or more search terms,
wherein a change of the overlapped object triggers a change of the accessed attribute,
wherein defining the search range for the search object includes:
determining whether the area of the display surface of the display device covered by the search object overlaps other displayed graphical objects, and
if determining that the area of the display surface of the display device covered by the search object overlaps no other displayed graphical objects, defining the search range to include all contents stored within a storage device of the display device; and
wherein performing the search includes performing the search with regard to all contents stored within the storage device of the display device based on the received one or more search terms.

2. The method according to claim 1, further comprising:
receiving a user input corresponding to a command to move the location at which the search object is displayed on the display surface of the display device;
updating, based on the received user input, the location at which the search object is displayed on the display surface of the display device;
determining, based on the updated location at which the search object is displayed on the display surface of the display device, a second area of the displayed surface covered by the search object;
based on the determined second area covered by the search object, defining a second search range for the search object;
receiving, through interaction with the search object, one or more additional search terms; and
performing a search within the determined second search range based on the received one or more additional search terms.

3. The method according to claim 1, further comprising:
receiving a user input corresponding to a command to select the search object and move the location at which the search object is displayed on the display surface of the display device in a closed curve that encompasses at least one other of the plurality of displayed graphical objects;
accessing an attribute associated with the at least one other displayed graphical object encompassed within the closed curve, the attribute associated with the at least one other displayed graphical object being an attribute other than a location of the at least one other displayed graphical object; and
defining the search range for the search object based on the accessed attribute associated with the at least one other displayed graphical object.

4. The method according to claim 3, wherein:
accessing the attribute associated with the at least one other displayed graphical object encompassed within the closed curve includes accessing a first attribute associated with a second object encompassed within the closed curve and accessing a third attribute associated with a second object encompassed within the closed curve, the first attribute and the second attribute being different in type; and
determining the search range for the search object includes determining the search range for the search object based on both of the first attribute and the second attribute.

5. The method according to claim 1, wherein the plurality of attributes include:
an attribute indicating a search with regard to the one or more contents contained in a folder, and
an attribute indicating a search on internet.

6. A display device for performing search according to search words inputted from a user, the display device comprising:
a display unit configured to display, on a display surface of the display device, a plurality of graphical objects including a first object corresponding to a search object, wherein the plurality of graphical objects other than the search object are associated with a plurality of attributes for search, and one attribute is different from another attribute;
a user interface configured to receive a user input corresponding to a command to move the location at which the search object is displayed on the display surface of the display device; and
a control unit configured to:
determine which object is overlapped with the search object by an area of the displayed surface covered by the search object among the plurality of graphical objects;
accesses an attribute associated with the overlapped object;
define a search range for the search object based on the accessed attribute associated with the overlapped object based on the accessed attribute associated with the overlapped object;
receive, through interaction with the search object, one or more search terms; and
perform a search within the determined search range based on the received one or more search terms,
wherein a change of the overlapped object triggers a change of the accessed attribute,
wherein the control unit performs search for all contents stored in the display device when there is no object which overlaps with the first object in display location.

7. The display device according to claim 6, wherein the search range is determined by an attribute of a second object which overlaps with the first object in display location.

8. The display device according to claim 7, wherein the control unit performs search in a folder corresponding to the second object when the second object is a folder comprising one or more contents.

9. The display device according to claim 7, wherein the control unit performs search with an application corresponding to the second object when the second object is an application enabling content search.

10. The display device according to claim 9, wherein the control unit performs search with a search application corresponding to the second object, on Internet.

11. The display device according to claim 6, wherein the search range is determined by an attribute of at least one object placed inside a closed curve which is formed by movement of the first object.

12. The display device according to claim 11, wherein two or more objects placed inside the closed curve have different attributes.

13. A non-transitory computer-readable medium storing instructions executable by one or more computers that, upon such execution, cause the one or more computers to perform operations comprising:
displaying, on a display surface of a display device, a plurality of graphical objects including a first object corresponding to a search object, wherein the plurality of graphical objects other than the search object are associated with a plurality of attributes for search, and one attribute is different from another attribute;
determining which object is overlapped with the search object by an area of the displayed surface covered by the search object among the plurality of graphical objects;
accessing an attribute associated with the overlapped object;
defining a search range for the search object based on the accessed attribute associated with the overlapped object;
receiving, through interaction with the search object, one or more search terms; and
performing a search within the determined search range based on the received one or more search terms,
wherein a change of the overlapped object triggers a change of the accessed attribute,
wherein defining the search range for the search object includes:
determining whether the area of the display surface of the display device covered by the search object overlaps other displayed graphical objects, and
if determining that the area of the display surface of the display device covered by the search object overlaps no other displayed graphical objects, defining the search range to include all contents stored within a storage device of the display device; and
wherein performing the search includes performing the search with regard to all contents stored within the storage device of the display device based on the received one or more search terms.

14. The non-transitory computer-readable medium according to claim 13, further comprising instructions executable by one or more computers that, upon such execution, cause the one or more computers to perform operations comprising:
receiving a user input corresponding to a command to move the location at which the search object is displayed on the display surface of the display device;
updating, based on the received user input, the location at which the search object is displayed on the display surface of the display device;
determining, based on the updated location at which the search object is displayed on the display surface of the display device, a second area of the displayed surface covered by the search object;
based on the determined second area covered by the search object, defining a second search range for the search object;
receiving, through interaction with the search object, one or more additional search terms; and
performing a search within the determined second search range based on the received one or more additional search terms.

15. The non-transitory computer-readable medium according to claim 13, further comprising instructions executable by one or more computers that, upon such execution, cause the one or more computers to perform operations comprising:
- receiving a user input corresponding to a command to select the search object and move the location at which the search object is displayed on the display surface of the display device in a closed curve that encompasses at least one other of the plurality of displayed graphical objects;
- accessing an attribute associated with the at least one other displayed graphical object encompassed within the closed curve, the attribute associated with the at least one other displayed graphical object being an attribute other than a location of the at least one other displayed graphical object; and
- defining the search range for the search object based on the accessed attribute associated with the at least one other displayed graphical object.

16. The non-transitory computer-readable according to claim 15, wherein:
- accessing the attribute associated with the at least one other displayed graphical object encompassed within the closed curve includes accessing a first attribute associated with a second object encompassed within the closed curve and accessing a second attribute associated with a second object encompassed within the closed curve, the first attribute and the second attribute being different in type; and
- determining the search range for the search object includes determining the search range for the search object based on both of the first attribute and the second attribute.

* * * * *